(12) United States Patent
Ju et al.

(10) Patent No.: US 12,267,597 B2
(45) Date of Patent: Apr. 1, 2025

(54) IMAGE SIGNAL AMPLIFYING CIRCUIT AND IMAGE SIGNAL AMPLIFYING METHOD

(71) Applicant: MEDIATEK INC., Hsin-Chu (TW)

(72) Inventors: Chi-Cheng Ju, Hsinchu (TW); Hsun-Chia Hsu, Hsinchu (TW); I-Hsien Lee, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 126 days.

(21) Appl. No.: 18/118,142

(22) Filed: Mar. 7, 2023

(65) Prior Publication Data

US 2023/0300471 A1 Sep. 21, 2023

Related U.S. Application Data

(60) Provisional application No. 63/321,326, filed on Mar. 18, 2022.

(51) Int. Cl.
*H04N 23/741* (2023.01)
*G06T 5/50* (2006.01)
*H04N 25/59* (2023.01)

(52) U.S. Cl.
CPC ............ *H04N 23/741* (2023.01); *G06T 5/50* (2013.01); *H04N 25/59* (2023.01); *G06T 2207/20208* (2013.01); *G06T 2207/20221* (2013.01)

(58) Field of Classification Search
CPC ...... H04N 23/741; H04N 25/59; H04N 23/76; H04N 25/78; G06T 5/50; G06T 2207/20208; G06T 2207/20221
See application file for complete search history.

(56) References Cited

U.S. PATENT DOCUMENTS

| | | |
|---|---|---|
| 2014/0078368 A1 | 3/2014 | Komori |
| 2015/0350516 A1* | 12/2015 | Rivard ............... G06T 5/50 |
| | | 348/229.1 |
| 2017/0339327 A1 | 11/2017 | Koshkin |
| 2021/0029322 A1* | 1/2021 | Mabuchi ............ H04N 25/778 |

FOREIGN PATENT DOCUMENTS

CN 102104744 A 6/2011

* cited by examiner

*Primary Examiner* — Mekonnen D Dagnew
(74) *Attorney, Agent, or Firm* — Winston Hsu

(57) ABSTRACT

An image signal amplifying circuit comprising an amplifier and a gain control circuit. The amplifier respectively amplifies a first image signal and a second image signal, which are generated by a pixel array of an image sensor, by a first analog gain and a second analog gain, wherein each one of pixel circuits of the pixel array comprises a first capacitor for generating the first image signal and a second capacitor for generating the second image signal, wherein a charge storage capacity of the first capacitor is smaller than a charge storage capacity of the second capacitor. The gain control circuit selectively adjusts the first analog gain or the second analog gain. Each one of the pixel circuits has a first conversion gain corresponding to the first capacitor and a second conversion gain corresponding to the second capacitor.

21 Claims, 6 Drawing Sheets

|  | Conversion gain | Analog gain | Benefit |
|---|---|---|---|
| C_1 | CG_1(H) | AG_11(H) | Kept dark region |
| C_2 | CG_1(H) | AG_12(L) | Less noise |
| C_3 | CG_2(L) | AG_23(H) | Continuous SNR |
| C_4 | CG_2(L) | AG_24(L) | Less saturation |

FIG. 2

| Conversion gain | Analog gain | Analog gain |
|---|---|---|
|  | T = 0 | T = 1 |
| CG_1(H) | AG_11(H) | AG_12(L) |
| CG_2(L) | AG_24(L) | AG_24(L) |

FIG. 4

| | Conversion gain | Analog gain |
|---|---|---|
| C_a1<br>C_a2<br>C_a3<br>⋮ | CG_1(H) | AG_1a<br>AG_1b<br>AG_1c<br>⋮ |
| C_b1<br>C_b2<br>C_b3<br>⋮ | CG_2(L) | AG_2a<br>AG_2b<br>AG_2c<br>⋮ |

FIG. 5

IMAGE SIGNAL AMPLIFYING CIRCUIT AND IMAGE SIGNAL AMPLIFYING METHOD

CROSS REFERENCE TO RELATED APPLICATIONS

This application claims the benefit of U.S. Provisional Application No. 63/321,326, filed on Mar. 18, 2022. The content of the application is incorporated herein by reference.

BACKGROUND

A conventional camera has an image sensor for sensing images. However, human eyes can perceive a higher dynamic range than the image sensor. Accordingly, a single exposure of the image sensor could not cover dark and bright regions at the same time. Details of a dark region of an image may be lost due to noises. Also, details of a bright region of the image may be lost due to saturation of pixels of the image.

For solving this problem, an HDR (High Dynamic Range Imaging) method is developed, it captures image with different exposure conditions at different time and fuse these images to generate a fusion image. However, such method may have the problem of image ghosting, which is caused by an object which is moving while capturing the images. Accordingly, for solving the image ghosting issue, a dual conversion gain image sensor is developed, which have two conversion gains and captures two images in one exposure. However, the conversion gains of the conversion gain image sensor are fixed, thus a ratio between the conversion gains is also fixed. Accordingly, the dynamic range of a fusion image generated according to images captured by the dual conversion gain image sensor is also fixed.

SUMMARY

One objective of the present application is to provide an image signal amplifying circuit which can increase a dynamic range of a fusion image and increases an image quality of the fusion image.

Another objective of the present invention is to provide an image signal amplifying method which can increase a dynamic range of a fusion image and increases an image quality of the fusion image.

One embodiment of the present invention discloses an image signal amplifying circuit comprising an amplifier and a gain control circuit. The amplifier is configured to amplify a first image signal by a first analog gain and to amplify a second image signal by a second analog gain, wherein the first image signal and the second image signal are generated by a pixel array of an image sensor, wherein each one of pixel circuits of the pixel array comprises a first capacitor for generating the first image signal and a second capacitor for generating the second image signal, wherein a charge storage capacity of the first capacitor is smaller than a charge storage capacity of the second capacitor. The gain control circuit, which is coupled to the amplifier, is configured to selectively set the first analog gain to one of a first gain value and a second gain value, or to selectively set the second analog gain to one of a third gain value and a fourth gain value, wherein the first gain value is larger than the second gain value, and the third gain value is larger than the fourth gain value; wherein each one of the pixel circuits has a first conversion gain corresponding to the first capacitor and a second conversion gain corresponding to the second capacitor.

Another embodiment of the present invention discloses an image signal amplifying circuit, comprising: an amplifier, configured to amplify a first image signal by a first analog gain and to amplify a second image signal generated by a pixel array of an image sensor, wherein a brightness of a dark image corresponding to the first image signal is lower than a brightness of a bright image corresponding to the second image signal, wherein the dark image and the bright image are generated by only one time of exposure of an image sensor; and a gain control circuit, coupled to the amplifier, configured to selectively set the first analog gain to one of a first gain value and a second gain value, or to selectively set the second analog gain to one of a third gain value and a fourth gain value, wherein the first gain value is larger than the second gain value, and the third gain value is larger than the fourth gain value; wherein each one of pixel circuits of the pixel array has a first conversion gain corresponding to the dark image and a second conversion gain corresponding to the bright image.

Still another embodiment of the present invention discloses an image signal amplifying method, comprising: (a) amplifying a first image signal by a first analog gain; (b) amplifying a second image signal by a second analog gain, wherein the first image signal and the second image signal are generated by a pixel array of an image sensor, wherein each one of pixel circuits of the pixel array comprises a first capacitor for generating the first image signal and a second capacitor for generating the second image signal, wherein a charge storage capacity of the first capacitor is smaller than a charge storage capacity of the second capacitor; and (c) selectively setting the first analog gain to one of a first gain value and a second gain value, or selectively setting the second analog gain to one of a third gain value and a fourth gain value, wherein the first gain value is larger than the second gain value, and the third gain value is larger than the fourth gain value; wherein each one of the pixel circuits has a first conversion gain corresponding to the first capacitor and a second conversion gain corresponding to the second capacitor.

In view of above-mentioned embodiments, the analog gain of the image sensor can be adjusted to a proper value corresponding to different requirements. For example, the analog gain can be adjusted to increase the dynamic range or to increase the image quality.

These and other objectives of the present application will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a schematic diagram illustrating gain combinations of conversion gains and analog gains according to one embodiment of the present application.

FIG. 4 is a schematic diagram illustrating changing the gain combinations according to a light condition of the image sensor, according to one embodiment of the present application.

FIG. 5 is a schematic diagram illustrating gain combinations of conversion gains and analog gains according to another embodiment of the present application.

DETAILED DESCRIPTION

In the following descriptions, several embodiments are provided to explain the concept of the present application. It will be appreciated that the term "first", "second", "third" in following descriptions are only for the purpose of distinguishing different one elements, and do not mean the sequence of the elements. For example, a first device and a second device only mean these devices can have the same structure but are different devices.

Figure 1:
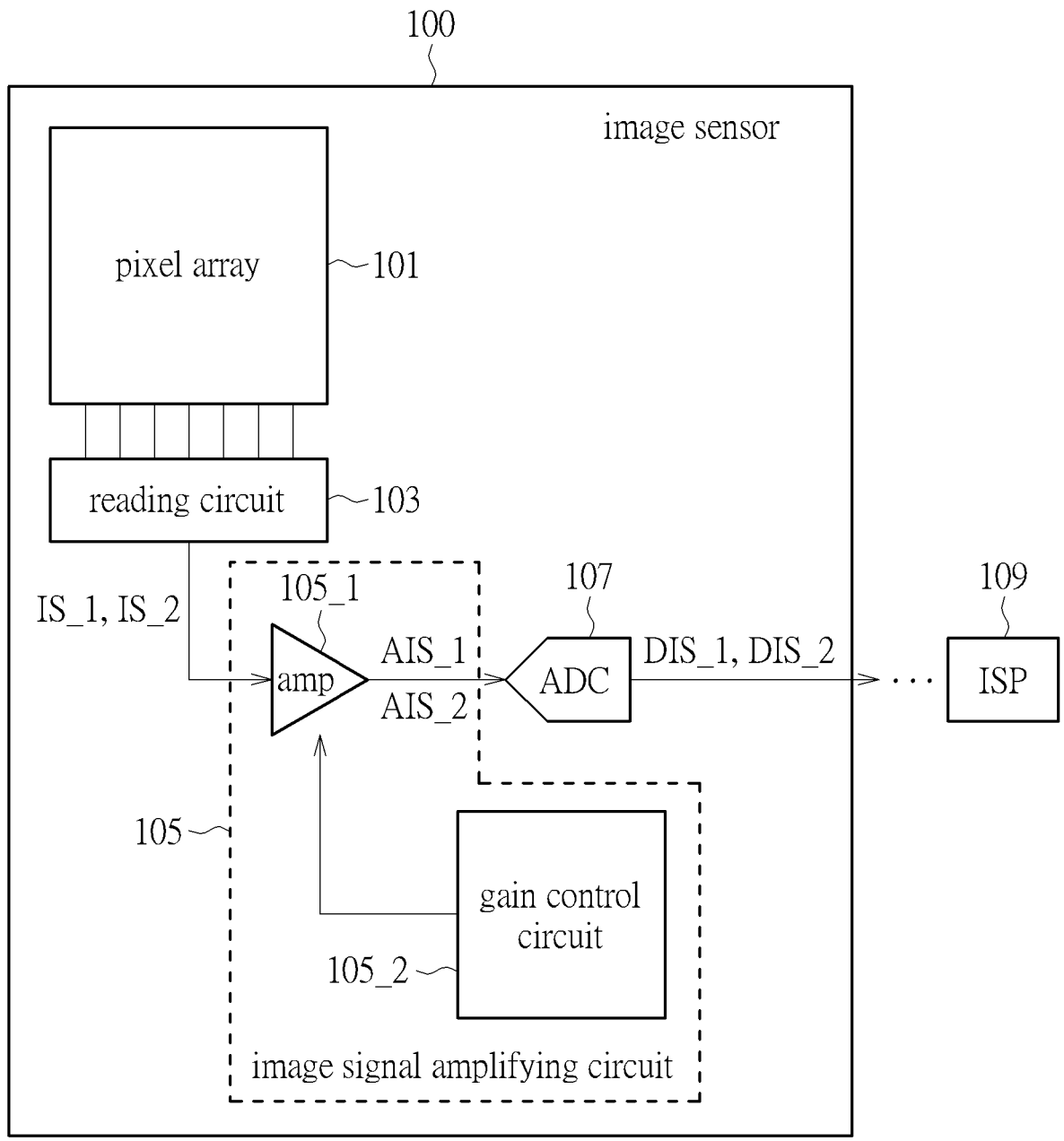
FIG. 1 is a schematic diagram illustrating an image signal amplifying circuit according to one embodiment of the present application.

FIG. 1 is a schematic diagram illustrating an image signal amplifying circuit 105 according to one embodiment of the present application. An image sensor 100 in FIG. 1 comprises a pixel array 101, a reading circuit 103, the image signal amplifying circuit 105, and an ADC 107. The pixel array 101 comprises a plurality of pixel circuits which generate sensing charges corresponding to the received light. The reading circuit 103 is configured to read the charges to generate image signals corresponding to the sensing charges generated by the pixel circuits. In one embodiment, the image sensor 100 is a dual conversion gain image sensor, thus each pixel circuit of the pixel array 101 comprises a first capacitor for generating a first image signal IS_1 and a second capacitor for generating a second image signal IS_2. A charge storage capacity of the first capacitor is smaller than a charge storage capacity of the second capacitor. The pixel circuit has a first conversion gain corresponding to the first capacitor and a second conversion gain corresponding to the second capacitor. The first conversion gain is higher than the second conversion gain. In one embodiment, the first conversion gain and the second conversion gain are related to the charge storage capacities of the first capacitor and the second capacitor, thus are fixed values.

In one embodiment, the first capacitor and the second capacitor are both physical capacitor components. However, the first capacitor or the second capacitor can mean parasitic capacitance of an electronic component such as a transistor. For example, the US patent application with a patent number US 20170148832 discloses such structure. The structures of the first capacitor and the second capacitor can be changed corresponding to different requirements.

The image signal amplifying circuit 105 comprises an amplifier 105_1 and a gain control circuit 105_2. The amplifier 105_1 is configured to amplify the first image signal IS_1 by a first analog gain to generate a first amplified image signal AIS_1, and configured to amplify the second image signal IS_2 by a second analog gain to generate a second amplified image signal AIS_2. The first analog gain and the second analog gain can be identical, but can be different as well. The gain control circuit 105_2, which is coupled to the amplifier 105_1, is configured to adjust the first analog gain or the second analog gain. In other words, the gain control circuit 105_2 is configured to selectively set the first analog gain to one of a first gain value and a second gain value, or to selectively set the second analog gain to one of a third gain value and a fourth gain value. In one embodiment, the first gain value is larger than the second gain value, and the third gain value is larger than the fourth gain value. Further, in one embodiment, the first gain value is equal to the third gain value, and the second gain value is equal to the fourth gain value.

As above-mentioned, the first analog gain is used to amplify the first image signal IS_1 from the first capacitor which corresponds to a higher first conversion gain, and the second analog gain is used to amplify the second image signal IS_2 from the second capacitor which corresponds to a lower second conversion gain. Accordingly, the gain control circuit 105_2 is configured to set the analog gain of the amplifier 105_1 such that the image sensor 100 can have different gain combinations. Each of the gain combinations is constituted of a conversion gain and an analog gain.

Please refer to FIG. 1 again. In one embodiment, the amplified first image signal AIS_1 and the amplified second image signal AIS_2 are transmitted to an ADC 107 to generate digital image signals DIS_1, DIS_2. The digital image signals DIS_1, DIS_2 may be transmitted to an ISP 109 (Image Signal Processor) which generates an image corresponding to the amplified first image signal AIS_1 and the amplified second image signal AIS_2. In one embodiment, the digital image signals DIS_1, DIS_2 can be further processed before received by the ISP 109. For example, black level calibration and digital gain tuning can be performed before the digital image signals DIS_1, DIS_2 are processed by the ISP 109. However, the operations for processing the amplified first image signal AIS_1 and the amplified second image signal AIS_2 to generate an image maybe different corresponding to different structures of the image sensor.

FIG. 2 is a schematic diagram illustrating gain combinations of conversion gains and analog gains according to one embodiment of the present application. The gain combination C_1 comprises the first conversion gain CG_1 (H) and the first analog gain with the first gain value AG_11 (H). The gain combination C_2 comprises the first conversion gain CG_1 (H) and the first analog gain with the second gain value AG_12 (L). The gain combination C_3 comprises the second conversion gain CG_2 (L) and the second analog gain AG_23 (H), which has the above-mentioned third gain value. The gain combination C_4 comprises the second conversion gain CG_2 (L) and the second analog gain AG_24 (L), which has the above-mentioned fourth gain value.

As above-mentioned, the first conversion gain CG_1 (H) is higher than the second conversion gain CG_2 (L). Also, the first analog gain with the first gain value AG_11 (H) is higher than the first analog gain with the second gain value AG_12 (L), and the second analog gain with the third gain value AG_23 (H) is higher than the second analog gain with the fourth gain value AG_24 (L). Further in one embodiment, the first analog gain with the first gain value AG_11 (H) is equal to the second analog gain with the third gain value AG_23 (H), and the first analog gain with the second gain value AG_12 (L) is equal to the second analog gain with the fourth gain value AG_24 (L).

Different gain combinations have different benefits. The gain combination C_1 can keep details of the dark region. The gain combination C_2 can reduce noises of the dark region (increase the image quality of dark region). The gain combination C_3 can deduce a difference between the noises of images which are generated based on different gain combinations (i.e., reducing noises of a fusion image). The gain combination C_3 can reduce a number of saturation pixels of a bright image.

In one embodiment, the image sensor 100 generates at least two of: a first image Img_1 corresponding to the gain combination C_1, a second image Img_2 corresponding to the gain combination C_2, a third image Img_3 corresponding to the gain combination C_3 and a fourth image Img_4 corresponding to the gain combination C_4. For example, the first image Img_1 corresponds to the digital image signal DIS_1 when the first analog gain is with the first gain value AG_11 (H), and the second image Img_2 corresponds to the digital image signal DIS_1 when the first analog gain is with the second gain value AG_12 (L). Also, the image sensor 100 or the ISP 109 may further comprises an image fusion circuit configured to fuse at least two of the first image Img_1, the second image Img_2, the third image Img_3 and the fourth image Img_4 to generate a fusion image. For example, the image sensor 100 generates the first image Img_1 and the third image Img_3, thus the fusion circuit generates the fusion image according to the first image Img_1 and the third image Img_3. For another example, the image sensor 100 generates the first image Img_1, the second image Img_2, the third image Img_3 and the fourth image Img_4, but the fusion circuit generates the fusion image only according to the first image Img_1, the second image Img_2, and the third image Img_3.

Figure 3:
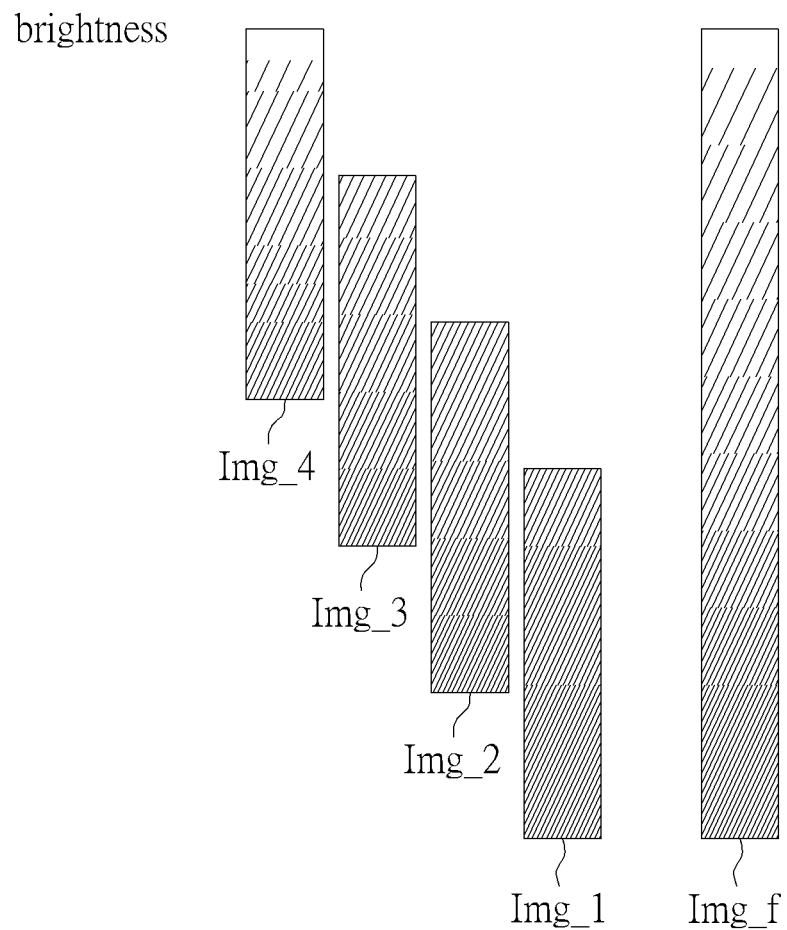
FIG. 3 is a schematic diagram illustrating brightness distributions of the images which are shown in FIG. 2 and a fused image, according to one embodiment of the present application.

FIG. 3 is a schematic diagram illustrating brightness distributions of the images shown in FIG. 2 and a fused image, according to one embodiment of the present application. As shown in FIG. 3, the first image Img_1 is a darkest image, since it corresponds to the gain combination C_1 which has a highest value. On the contrary, the fourth image Img_4 is a brightest image, since it corresponds to the gain combination C_4 which has a lowest value. The second image Img_2 and the third image Img_3 also have different brightness distribution due to different gain combinations. Accordingly, if the first image Img_1 and the fourth image Img_4 are used to generate the fusion image Img_f, the fusion image has a larger dynamic range. Besides, if the second image Img_2 and the third image Img_3 are used to generate the fusion image, the image has a better image quality. In one embodiment, the second image Img_2 is used as a primary reference image during fusion since it has less noise than using the first image Img_1.

Accordingly, the analog gain can be determined according to required image condition. For example, if the fusion image is supposed to have a large dynamic range, a high analog gain is set for the high conversion gain (the gain combination C_1) and a low analog gain is set for the low conversion gain (the gain combination C_4). For another example, if the fusion image is supposed to have a better image quality, a low analog gain is set for the high conversion gain (the gain combination C_2) and a high analog gain is set for the low conversion gain (the gain combination C_3).

In one embodiment, the analog gain can be automatically set according to a light condition sensed by the image sensor. FIG. 4 is a schematic diagram illustrating changing the gain combinations according to a light condition, according to one embodiment of the present application. In the embodiment of FIG. 4, a camera using the image sensor 100 moves from a high dynamic range scene (T=0) to a low dynamic range scene (T=1). In such case, the analog gain for the first conversion gain CG_1 (H) is adjusted from the first analog gain with the first gain value AG_11 (H) to the first analog gain with the second gain value AG_12 (L), since no large dynamic range is needed when T=1. By this way, the noise of the fusion image can be reduced when a proper dynamic range is maintained. In one embodiment, the operations illustrated in FIG. 4 are performed when the camera continuous recording images. In another embodiment, the operations illustrated in FIG. 4 are performed when the camera continuous sensing images but does not record images (e.g., the camera operates in a live view mode).

Besides, in above-mentioned embodiments, the first analog gain can be set to one of the two candidate gain values (e.g., the first gain value and the second gain value), and the second analog gain can be set to one of the two candidate gain values (e.g., the third gain value and the fourth gain value). However, in one embodiment, the number of gain values can be more than two. FIG. 5 is a schematic diagram illustrating combinations of conversion gains and analog gains according to another embodiment of the present application. As shown in FIG. 5, the first analog gain can be adjusted to one of at least three first analog gains with different gain values AG_1a, AG_1b and AG_1c. Correspondingly, the gain combination C_a1 comprises the first conversion gain CG_1 (H) and the first analog gain with the first gain value AG_1a, the gain combination C_a2 comprises the first conversion gain CG_1 (H) and the first analog gain with the second gain value AG_1b, and the gain combination C_a3 comprises the first conversion gain CG_1 (H) and the first analog gain with a fifth gain value AG_1c . . . . Similarly, the second analog gain can be adjusted to one of at least three second analog gains with different gain values AG_2a, AG_2b and AG_2c. Correspondingly, the gain combination C_b1 comprises the second conversion gain CG_2(L) and the second analog gain with the third gain value AG_2a, the gain combination C_b2 comprises the second conversion gain CG_2(L) and the second analog gain with the fourth gain value AG_2b, and the gain combination C_b3 comprises the second conversion gain CG_2(L) and the second analog gain with a sixth gain value AG_2c . . . .

Furthermore, in the above-mentioned embodiments, either the analog gain for the first conversion gain CG_1(H) or the analog gain for the second conversion gain CG_2(L) can be adjusted. However, in another embodiment, only one of the analog gains for first conversion gain CG_1(H) and the second conversion gain CG_2(L) is adjustable but the other one of the analog gains is fixed. For example, the analog gain for the first conversion gain CG_1(H) is adjustable but the analog gain for the second conversion gain CG_2(L) is fixed.

Additionally, in view of above-mentioned descriptions, the dual conversion gain image sensor can be replaced by an image sensor which generates a dark image by the first conversion gain and a bright image by the second conversion gain by only one time of exposure of the image sensor. A brightness of a dark image is lower than a brightness of the bright image. In such case, the above-mentioned first image signal corresponds to the dark image, and the above-mentioned second image signal corresponds to the bright image. Further, each of pixel circuits of the pixel array has a first conversion gain corresponding to the dark image and a second conversion gain corresponding to the bright image. Also, it will be appreciated that the above-mentioned image signal amplifying circuit can be used for other applications rather than limited to fuse images.

Figure 6:
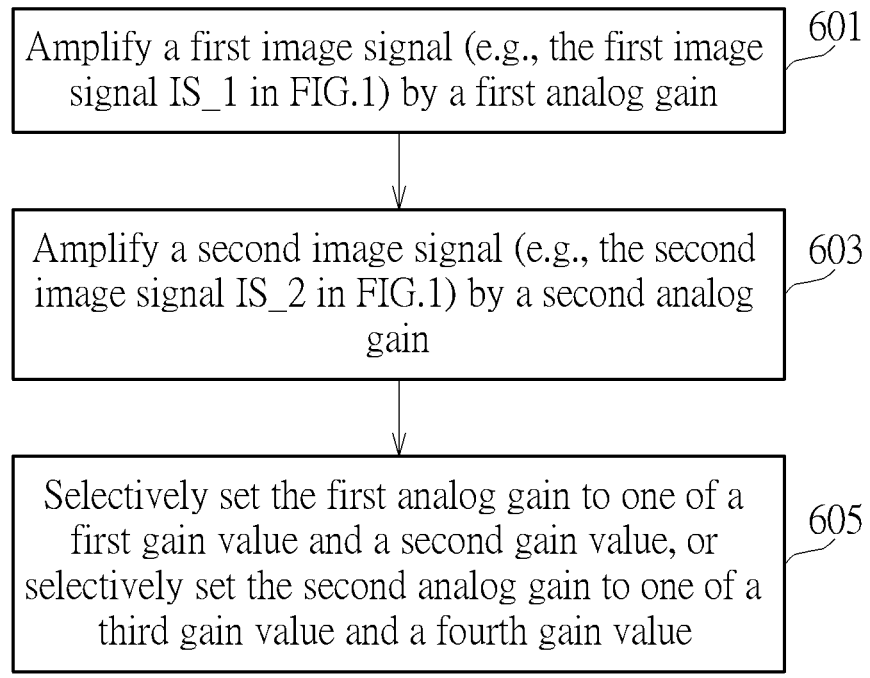
FIG. 6 is a flow chart illustrating an image signal amplifying method, according to one embodiment of the present application.

In view of above-mentioned embodiments, an image signal amplifying method can be acquired. FIG. 6 is a flowchart illustrating an image signal amplifying method, according to one embodiment of the present application. The image signal amplifying method comprises:

Step 601

Amplify a first image signal (e.g., the first image signal IS_1 in FIG. 1) by a first analog gain.

Step 603

Amplify a second image signal (e.g., the second image signal IS_2 in FIG. 1) by a second analog gain.

The first image signal and the second image signal are generated by a pixel array of an image sensor. Each one of pixel circuits of the pixel array comprises a first capacitor for generating the first image signal and a second capacitor for generating the second image signal. A charge storage capacity of the first capacitor is smaller than a charge storage capacity of the second capacitor.

Each one of the pixel circuits has a first conversion gain corresponding to the first capacitor and a second conversion gain corresponding to the second capacitor.

Step 605

Selectively set the first analog gain to one of a first gain value and a second gain value, or selectively set the second analog gain to one of a third gain value and a fourth gain value. The first gain value is larger than the second gain value, and the third gain value is larger than the fourth gain value.

In other words, in one embodiment, either the first analog gain or the second analog gain is adjustable. In another embodiment, only one of the first analog gain and the second analog gain is adjustable.

If the image signal amplifying method is used to generate a fusion image, it may further comprises following steps:

Generating at least two of a first image, a second image, a third image and a fourth image (e.g., the first image Img_1, the second image Img_2, the third image Img_3 and the fourth image Img_4 in FIG. 3), wherein the first image corresponds to the first conversion gain and the first gain value, wherein the second image corresponds to the first conversion gain and the second gain value, wherein the third image corresponds to the second conversion gain and the third gain value, wherein the fourth image corresponds to the second conversion gain and the fourth gain value; and Fuse at least two of the first image, the second image, the third image and the fourth image to generate a fusion image.

Other detail steps can be acquired in view of above-mentioned embodiments, thus are omitted for brevity here.

In view of above-mentioned embodiments, the analog gain of the image sensor can be adjusted to a proper value corresponding to different requirements. For example, the analog gain can be adjusted to increase the dynamic range or to increase the image quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image signal amplifying circuit, comprising:
    an amplifier, configured to amplify a first image signal by a first analog gain and to amplify a second image signal by a second analog gain, wherein the first image signal and the second image signal are generated by a pixel array of an image sensor, wherein each one of pixel circuits of the pixel array comprises a first capacitor for generating the first image signal and a second capacitor for generating the second image signal, wherein a charge storage capacity of the first capacitor is smaller than a charge storage capacity of the second capacitor; and
    a gain control circuit, coupled to the amplifier, configured to selectively set the first analog gain to one of a first gain value and a second gain value, or to selectively set the second analog gain to one of a third gain value and a fourth gain value, wherein the first gain value is larger than the second gain value, and the third gain value is larger than the fourth gain value;
    wherein each one of the pixel circuits has a first conversion gain corresponding to the first capacitor and a second conversion gain corresponding to the second capacitor.

2. The image signal amplifying circuit of claim 1, wherein the first conversion gain and the second conversion gain are fixed values.

3. The image signal amplifying circuit of claim 1, wherein the first gain value is equal to the third gain value, and the second gain value is equal to the fourth gain value.

4. The image signal amplifying circuit of claim 1, wherein the gain control circuit sets the first analog gain or the second analog gain according to light condition sensed by the image sensor.

5. The image signal amplifying circuit of claim 4, wherein the light condition comprises a dynamic range scene.

6. The image signal amplifying circuit of claim 1,
    wherein the image sensor generates at least two of a first image, a second image, a third image and a fourth image, wherein the first image corresponds to the first conversion gain and the first gain value, wherein the second image corresponds to the first conversion gain and the second gain value, wherein the third image corresponds to the second conversion gain and the third gain value, wherein the fourth image corresponds to the second conversion gain and the fourth gain value;
    wherein the image signal amplifying circuit is utilized for an image sensor comprising:
    an image fusion circuit, configured to fuse at least two of the first image, the second image, the third image and the fourth image to generate a fusion image.

7. The image signal amplifying circuit of claim 6, wherein the fusion circuit applies the second image as a primary reference image during fusion.

8. An image signal amplifying circuit, comprising:
    an amplifier, configured to amplify a first image signal by a first analog gain and to amplify a second image signal generated by a pixel array of an image sensor, wherein a brightness of a dark image corresponding to the first image signal is lower than a brightness of a bright image corresponding to the second image signal, wherein the dark image and the bright image are generated by only one time of exposure of an image sensor; and
    a gain control circuit, coupled to the amplifier, configured to selectively set the first analog gain to one of a first gain value and a second gain value, or to selectively set the second analog gain to one of a third gain value and a fourth gain value, wherein the first gain value is larger than the second gain value, and the third gain value is larger than the fourth gain value;
    wherein each one of pixel circuits of the pixel array has a first conversion gain corresponding to the dark image and a second conversion gain corresponding to the bright image.

9. The image signal amplifying circuit of claim 8, wherein the first conversion gain and the second conversion gain are fixed values.

10. The image signal amplifying circuit of claim 8, wherein the first gain value is equal to the third gain value, and the second gain value is equal to the fourth gain value.

11. The image signal amplifying circuit of claim 8, wherein the gain control circuit automatically sets the first analog gain or the second analog gain according to light condition sensed by the image sensor.

12. The image signal amplifying circuit of claim 11, wherein the light condition comprises a dynamic range scene.

13. The image signal amplifying circuit of claim 8,
wherein the image sensor generates at least two of a first image, a second image, a third image and a fourth image, the first image corresponding to the first conversion gain and the first gain value, the second image corresponding to the first conversion gain and the second gain value, the third image corresponding to the second conversion gain and the third gain value, the fourth image corresponding to the second conversion gain and the second gain value;
wherein the image signal amplifying circuit is utilized for an image sensor comprising:
an image fusion circuit, configured to fuse at least two of the first image, the second image, the third image and the fourth image to generate a fusion image.

14. The image signal amplifying circuit of claim 13, wherein the fusion circuit applies the second image as a primary reference image during fusion.

15. An image signal amplifying method, comprising:
(a) amplifying a first image signal by a first analog gain;
(b) amplifying a second image signal by a second analog gain, wherein the first image signal and the second image signal are generated by a pixel array of an image sensor, wherein each one of pixel circuits of the pixel array comprises a first capacitor for generating the first image signal and a second capacitor for generating the second image signal, wherein a charge storage capacity of the first capacitor is smaller than a charge storage capacity of the second capacitor; and
(c) selectively setting the first analog gain to one of a first gain value and a second gain value, or selectively setting the second analog gain to one of a third gain value and a fourth gain value, wherein the first gain value is larger than the second gain value, and the third gain value is larger than the fourth gain value;
wherein each one of the pixel circuits has a first conversion gain corresponding to the first capacitor and a second conversion gain corresponding to the second capacitor.

16. The image signal amplifying method of claim 15, wherein the first conversion gain and the second conversion gain are fixed values.

17. The image signal amplifying method of claim 15, wherein the first gain value is equal to the third gain value, and the second gain value is equal to the fourth gain value.

18. The image signal amplifying method of claim 15, wherein the step (c) sets the first analog gain or the second analog gain according to light condition sensed by the image sensor.

19. The image signal amplifying method of claim 18, wherein the light condition comprises a dynamic range scene.

20. The image signal amplifying method of claim 15, further comprising:
(d) generating at least two of a first image, a second image, a third image and a fourth image, wherein the first image corresponds to the first conversion gain and the first gain value, wherein the second image corresponds to the first conversion gain and the second gain value, wherein the third image corresponds to the second conversion gain and the third gain value, wherein the fourth image corresponds to the second conversion gain and the fourth gain value; and
(e) fusing at least two of the first image, the second image, the third image and the fourth image to generate a fusion image.

21. The image signal amplifying method of claim 20, wherein the step (e) applies the second image as a primary reference image during fusion.

* * * * *